United States Patent [19]
Takaoka et al.

[11] Patent Number: 5,383,757
[45] Date of Patent: Jan. 24, 1995

[54] MULTI-DECK PARKING STRUCTURE

[75] Inventors: Shigekazu Takaoka; Kazushi Tsujimoto, both of Komaki, Japan

[73] Assignee: Daifuku Co., Ltd., Osaka, Japan

[21] Appl. No.: 126,335

[22] Filed: Sep. 23, 1993

[30] Foreign Application Priority Data

Oct. 6, 1992 [JP] Japan ................... 4-266433
Dec. 3, 1992 [JP] Japan ................... 4-323524

[51] Int. Cl.⁶ ........................................ E04H 6/18
[52] U.S. Cl. ............................ 414/240; 414/264
[58] Field of Search ............... 414/231–234, 414/239, 240, 241, 252, 253, 264; 187/105, 131, 132, 140

[56] References Cited

U.S. PATENT DOCUMENTS

| | | | |
|---|---|---|---|
| 1,554,584 | 9/1925 | Lake | 414/246 |
| 1,757,331 | 5/1930 | Porter | 414/264 |
| 2,223,962 | 12/1940 | Mitchell | 414/260 X |
| 2,285,232 | 6/1942 | Sheehan | 414/264 |
| 3,240,364 | 3/1966 | Kapnek et al. | 414/240 X |
| 4,322,804 | 3/1982 | Evans | 414/231 X |
| 4,664,589 | 5/1987 | Matoba | 414/228 |
| 4,869,634 | 9/1989 | Carter | 414/240 |
| 4,936,730 | 6/1990 | Morioka | 414/239 |
| 4,951,786 | 8/1990 | Haraguchi | 187/132 X |
| 4,976,581 | 12/1990 | Wu | 414/257 |
| 5,000,292 | 3/1991 | Chapelain et al. | 187/1 R |
| 5,018,926 | 5/1991 | Sternad | 414/253 |
| 5,116,182 | 5/1992 | Lin | 414/254 |
| 5,118,239 | 6/1992 | Morioka | 414/235 |
| 5,129,776 | 7/1992 | Peng | 414/232 X |
| 5,281,069 | 1/1994 | Tsujimoto | 414/231 |
| 5,292,218 | 3/1994 | Ikenouchi et al. | 414/231 X |

FOREIGN PATENT DOCUMENTS

| | | | |
|---|---|---|---|
| 194563 | 1/1958 | Austria . | |
| 407973 | 1/1991 | European Pat. Off. . | |
| 602179 | 12/1926 | France | 414/239 |
| 1434545 | 11/1968 | Germany . | |
| 519248 | 3/1955 | Italy | 52/30 |
| 284864 | 12/1987 | Japan . | |
| 284678 | 11/1989 | Japan | 414/232 |
| 35173 | 2/1990 | Japan . | |
| 115475 | 4/1990 | Japan | 414/231 |
| 403275 | 6/1966 | Switzerland . | |
| 337726 | 10/1930 | United Kingdom . | |
| 771399 | 4/1957 | United Kingdom . | |
| 1075793 | 7/1967 | United Kingdom . | |
| 1321635 | 6/1973 | United Kingdom . | |

Primary Examiner—David A. Bucci
Attorney, Agent, or Firm—Webb Ziesenheim Bruening Logsdon Orkin & Hanson

[57] ABSTRACT

A multi-deck parking structure includes a plurality of decks for storing pallets constructed to carry vehicles, respectively, an entrance section for receiving and delivering vehicles, and a movable unit for moving upward and downward through a vertical shaft extending laterally of the decks into the entrance section, to transport the pallets between the entrance section and the decks. The movable unit has pallet supporting fork assemblies extendible to and retractable from the decks, and footpath floors for allowing a person to walk thereon. The footpath floors are vertically movable relative to the pallet supporting fork assemblies. The entrance section includes an adjusting device for keeping the footpath floors substantially level with floor surfaces of the entrance section and supporting surfaces of the pallet supporting fork assemblies when the movable unit is placed in the entrance section, and lowering the footpath floors below the supporting surfaces of the pallet supporting fork assemblies when the pallet supporting assemblies are in a position to extend to or retract from the decks.

12 Claims, 12 Drawing Sheets

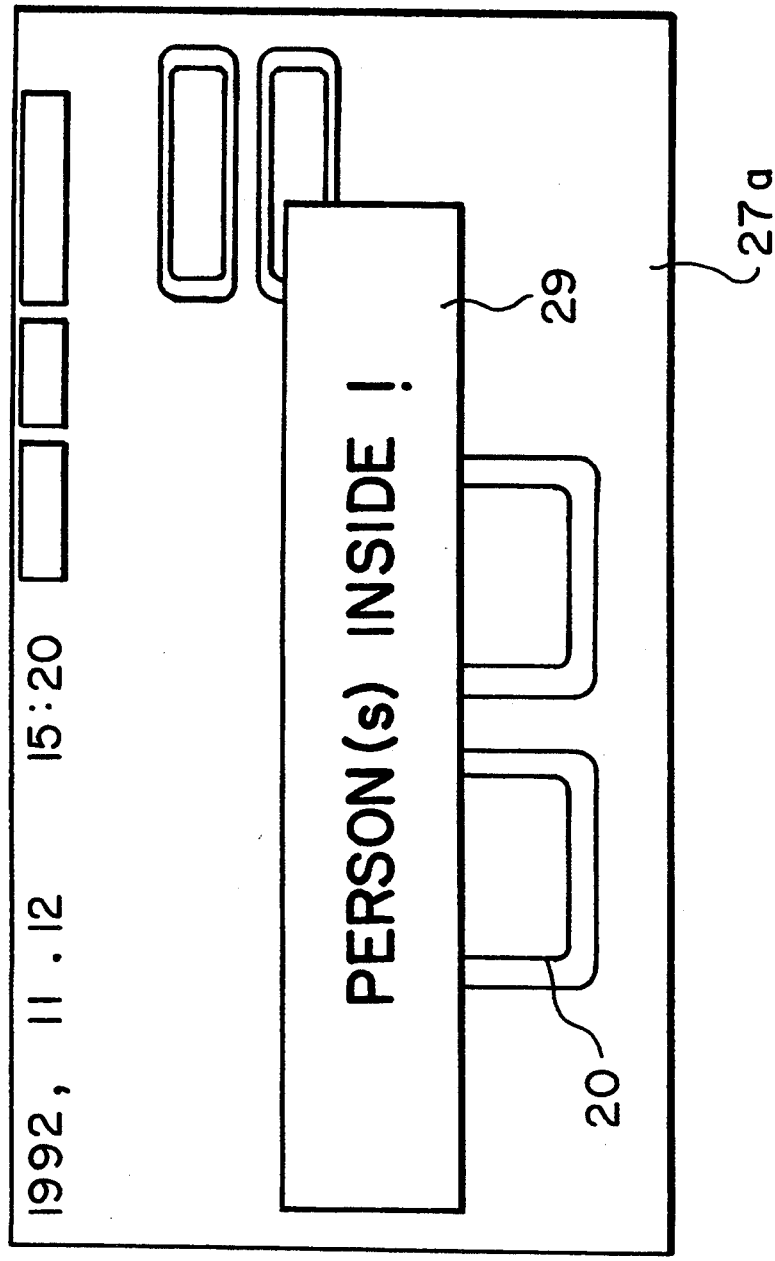

MULTI-DECK PARKING STRUCTURE

BACKGROUND OF THE INVENTION

1. Field of the Invention

This invention relates to multi-deck parking structures. More particularly, the invention relates to a multi-deck parking structure including vehicle storing racks extending upward from an entrance section through which vehicles are brought in and taken out. Each rack has a plurality of decks arranged vertically to receive pallets for supporting vehicles. The pallets are transported between the entrance section and the plurality of decks by a vehicle transport device having a movable unit raised and lowered through a vertical shaft extending laterally of the vehicle storing racks into the entrance section. The movable unit includes a pallet support movable into and out of the vehicle storing racks, and footpath floors for allowing a person to walk on the movable unit when moving between the entrance section and movable unit in the entrance section.

2. Description of the Related Art

Conventionally, in this type of multi-deck parking structure, the pallet support and footpath floors are fixed to the movable unit such that the footpath floors are below supporting surfaces of the pallet support. The footpath floors are fixed to be out of contact with a lower surface of a pallet placed on the pallet support, thereby to avoid interference with movement of the pallet when the pallet support moves into or away from the vehicle storing racks (see Japanese Patent Application No. 3-288200, for example).

In the prior art as noted above, the pallet support projects above the footpath floors, which results in the inconvenience of forming a difference in level between the supporting surfaces of the pallet support and the footpath floors.

Moreover, to present an improved appearance, guides or the like having inclined surfaces rising toward the supporting surfaces of the pallet support must be formed on the footpath floors and on floor surfaces of the entrance section.

SUMMARY OF THE INVENTION

The object of the present invention is to provide a multi-deck parking structure which has great utility and overcomes the disadvantages of the prior an noted above.

The above object is fulfilled, according to the present invention, by a multi-deck parking structure comprising footpath floors vertically movable relative to the pallet support, and an adjusting device for keeping the footpath floors substantially level with floor surfaces of the entrance section and supporting surfaces of the pallet support when the movable unit is placed in the entrance section, and lowering the footpath floors below the supporting surfaces of the pallet support when the pallet support is in a position to extend into or retract from the vehicle storing racks.

As noted above, the footpath floors according to the present invention are vertically movable relative to the pallet support, and an adjusting device is provided to adjust a level of the footpath floors relative to the pallet support. The footpath floors are lowered below the supporting surfaces of the pallet support when the pallet support is in a position to extend into or retract from the vehicle storing racks. The footpath floors are set substantially level with the floor surfaces of the entrance section and supporting surfaces of the pallet support when the movable unit is placed in the entrance section.

Since the footpath floors are substantially level with the floor surfaces of the entrance section and the supporting surfaces of the pallet support when the movable unit is placed in the entrance section, this multi-deck parking structure eliminates the inconveniences of forming a level difference between the footpath floors and supporting surfaces of the pallet support and of requiring guides to be formed on the footpath floors and the floor surfaces of the entrance section.

The adjusting device may be in the form of support members disposed in the entrance section for supporting the footpath floors when the movable unit is placed in the entrance section.

With this construction, the adjusting device in the form of support members disposed in the entrance section receives and supports the footpath floors as the movable unit is lowered down the vertical shaft into the entrance section. As a result, the footpath floors are placed substantially level with the floor surfaces of the entrance section, and raised relative to the pallet support.

Thus, the multi-deck parking structure has an adjusting device of simple construction to receive and support the footpath floors as the movable unit is lowered down the vertical shaft into the entrance section. When the movable unit is stopped, the footpath floors are substantially level with the floor surfaces of the entrance section and the supporting surfaces of the pallet support.

The footpath floors may include elastic members arranged in positions thereof adjacent the floor surfaces of the entrance section for elastically contacting or lying close to the floor surfaces to close gaps between the floor surfaces and the footpath floors when the movable unit is placed in the entrance section.

With this construction, the elastic members close gaps between the floor surfaces of the entrance section and the footpath floors when the footpath floors are substantially level with the floor surfaces of the entrance section. A person may walk on a flat and continuous plane between the entrance section and movable unit.

Since the portions on which a person may walk in moving between the entrance section and movable unit are formed flat and continuous, this multi-deck parking structure has an improved interior appearance of the entrance section, and allows a person to walk with ease.

The entrance section may include mat switches arranged substantially over an entire floor area thereof for detecting presence of a person or persons.

A small number of mat switches can cover large areas for detecting presence of persons. Such mat switches are arranged substantially over an entire floor area of the entrance section.

Consequently, presence of persons may be detected substantially over the entire floor area of the entrance section by means of a small number of components. Operation of the vehicle transport device may be stopped or varied upon detection of a person to assure safety of the person in the entrance section. This multi-deck parking structure has a reduced number of components, a simplified construction and control, and reduced manufacturing cost and running cost.

The footpath floors of the movable unit may also include mat switches for detecting presence of a person thereon.

The mat switches provided for the footpath floors can detect presence of a person thereon when the movable unit is in the entrance section.

This multi-deck parking structure has a reduced number of components, a simplified construction and control, and reduced manufacturing cost and running cost, while assuring safety of persons in the entrance section.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 12 is a view showing a display screen of the parking structure shown in FIG. 9.

DETAILED DESCRIPTION OF THE PREFERRED EMBODIMENTS

A multi-deck parking structure according to the present invention will be described in detail with reference to the drawings.

Figure 1:
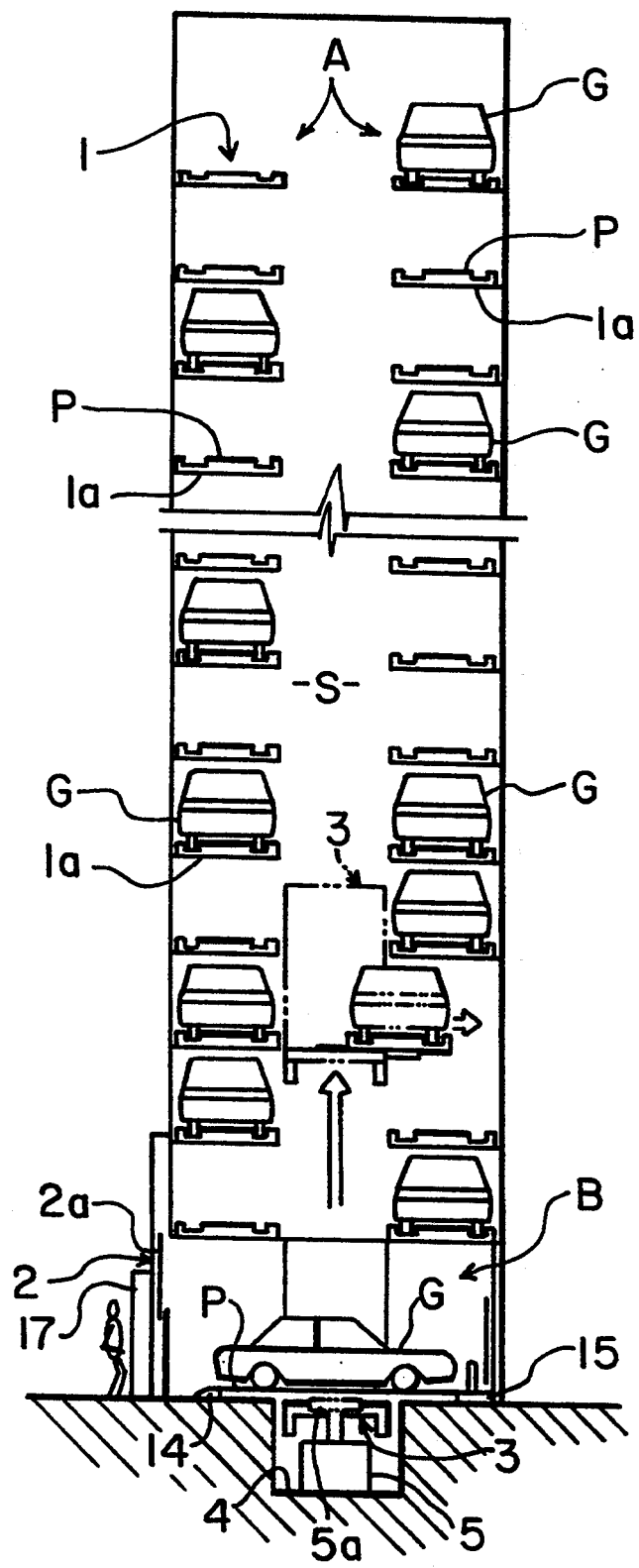
FIG. 1 is a sectional overall view of a multi-deck parking structure according to the present invention.

FIG. 1 shows the entirety of the multi-deck parking structure. This parking structure includes an entrance section B for communicating with the outside, which is disposed on the ground level of the parking structure. The entrance section B has an inlet/outlet opening 2 on one side thereof for vehicles G to move into and out of the parking structure.

Vehicle storing racks A are disposed over the entrance section B. Each rack A includes a plurality of decks 1 arranged vertically for storing pallets P with or without vehicles G resting thereon. A vehicle transport device C includes a movable unit 3 raised and lowered along a vertical shaft S for transporting vehicles G between the entrance section B and the plurality of decks 1. The inlet/outlet opening 2 has a door 2a openable and closable by a drive device.

In the following description, the longitudinal direction of the parking structure refers to the direction from the inlet/outlet opening 2 toward a deep interior of the entrance section B, and the transverse direction refers to the direction of width of the inlet/outlet opening 2 perpendicular to the longitudinal direction.

A driver drives his or her vehicle G through the inlet/outlet opening 2 into the entrance section B, and stops the vehicle G on a pallet P laid in the entrance section B. Then, the movable unit 3 transports the vehicle G with the pallet P to one of the decks 1 for storage.

When retrieving the vehicle G, the movable unit 3 transports the vehicle G from the deck 1 to the entrance section B, and the driver enters the vehicle G and drives it out through the inlet/outlet opening 2.

Each deck 1 includes a pallet P and a pair of supporting frames 1a for supporting end edges of the pallet P. The vehicle storing racks A are arranged in forward and rearward positions with respect to the longitudinal direction inside the multi-deck parking structure. The pallets P placed in the racks A have a longitudinal direction thereof corresponding to the transverse direction of the parking structure.

The vertical shaft S through which the movable unit 3 is raised and lowered extends between and laterally of the vehicle storing racks A. The vertical shaft S has a lower end thereof extending into the entrance section B. The movable unit 3 and a pallet P are present in the entrance section B when a vehicle G is brought into or taken out of the parking structure. A pit 4 is formed under the entrance section B to be continuous with the lower end of the vertical shaft S. The pit 4 contains a swivel device 5 having a vertically movable and swivelable turntable 5a.

Figure 2:
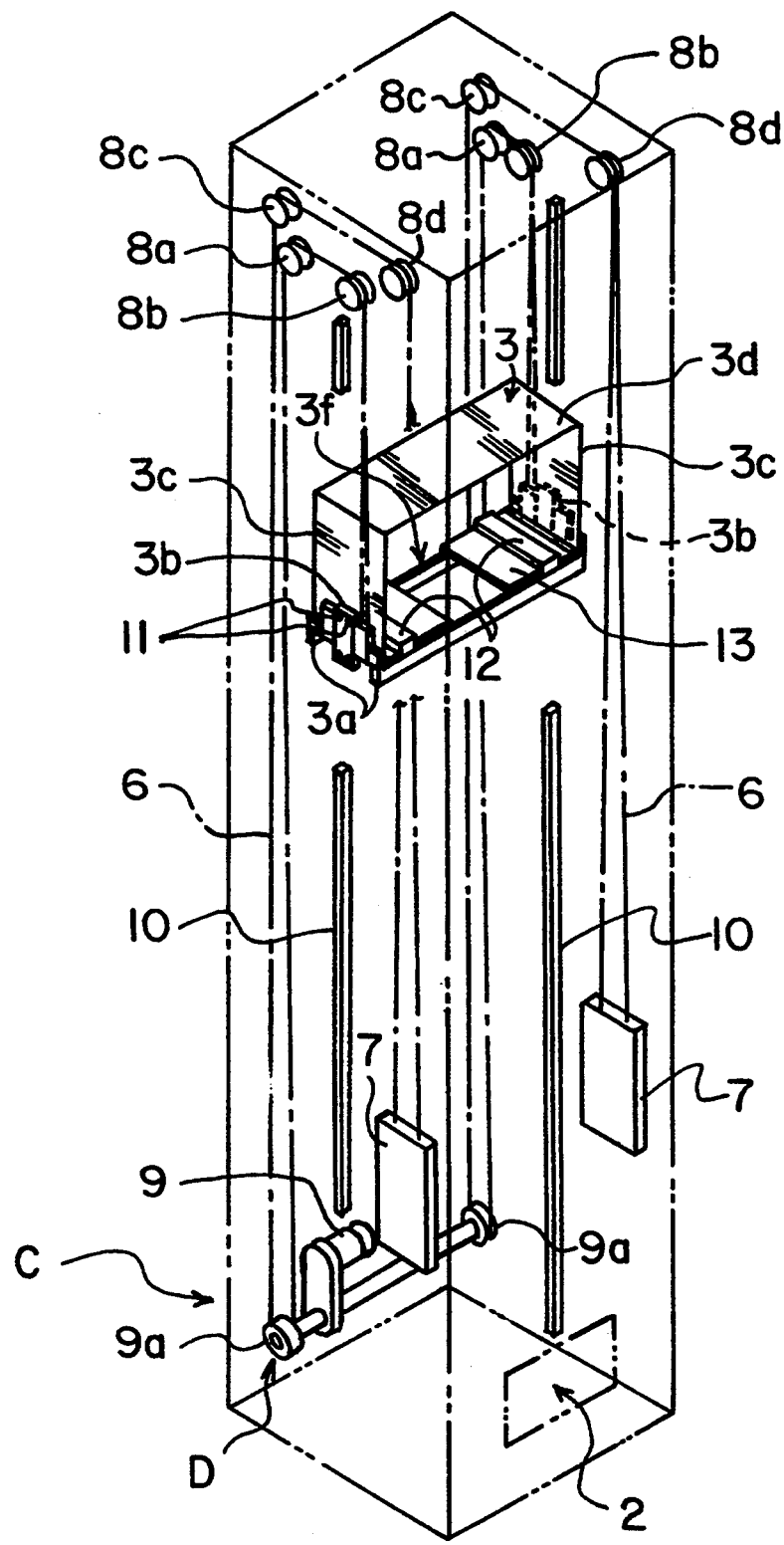
FIG. 2 is a perspective view of a drive mechanism for raising and lowering a movable unit.

As shown in FIG. 2, the movable unit 3 defines a bore 3f for receiving the turntable 5a. As shown in FIG. 1, the turntable 5a carries pallet P when the movable unit 3 is lowered into the pit 4.

When a vehicle G is moved into the parking structure, the pallet P is placed on the floor of the entrance section B so that the longitudinal direction of the pallet P is aligned to the longitudinal direction of the parking structure. After the vehicle G is moved onto the pallet P, the turntable 5a turns the pallet P 90 degrees. Then, the movable unit 3 is raised to pick up the pallet P oriented to have the longitudinal direction thereof aligned to the transverse direction of the parking structure. This operation is reversed when the vehicle G is retrieved.

FIG. 2 shows the movable unit 3, and a drive mechanism D for raising and lowering the movable unit 3. The drive mechanism D includes two systems of cables 6 each connecting the movable unit 3 to a counterweight 7. The cables 6 are wound around suspender pulleys 8a, 8b, 8c and 8d arranged in upper positions of the multi-deck parking structure, and drive pulleys 9a disposed in lower positions of the parking structure. The drive pulleys 9a are rotatable by a drive device 9. Thus, the movable unit 3 is suspended in the vertical shaft S by the cables 6, and raised and lowered by the drive device 9.

Figure 3:
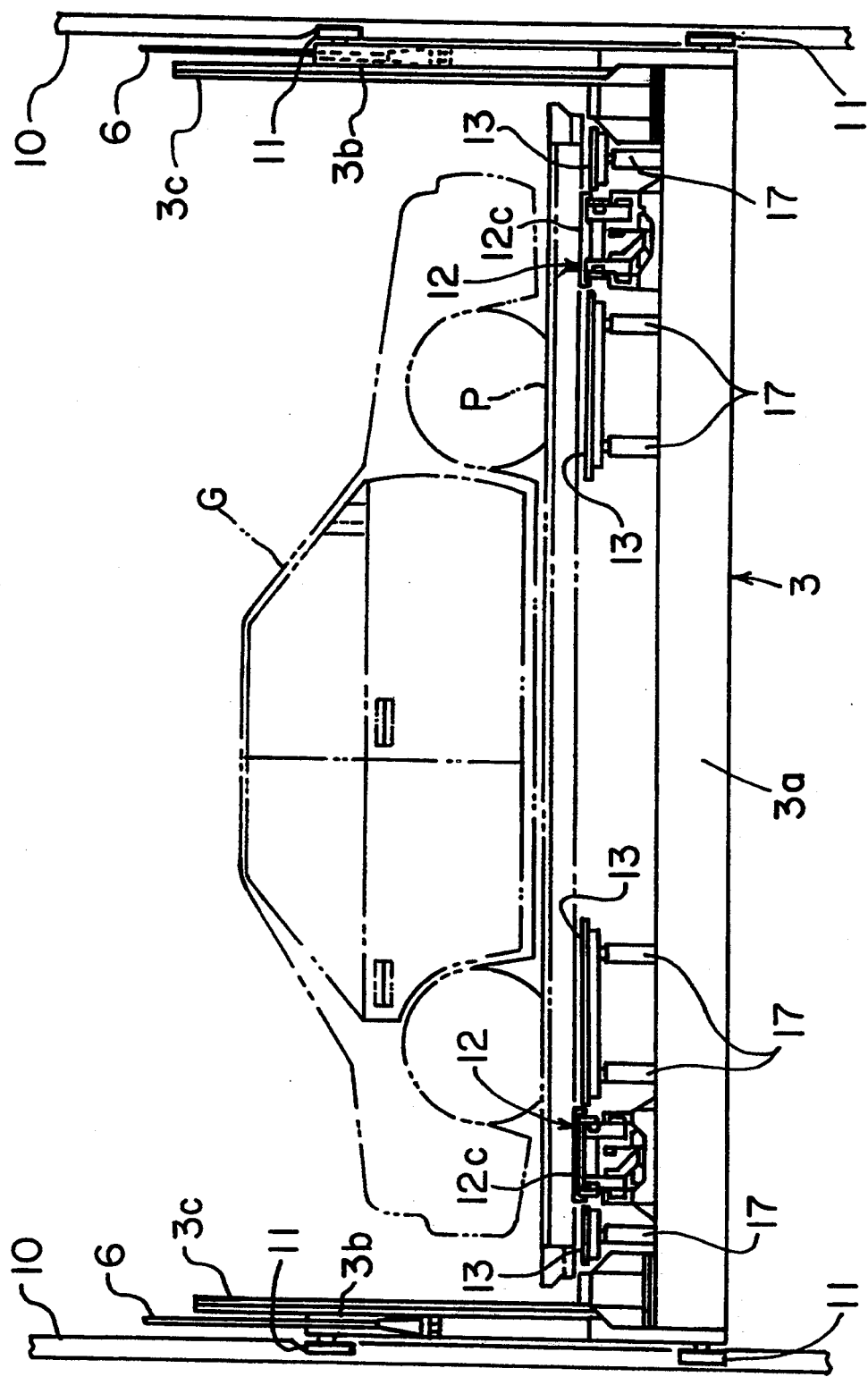
FIG. 3 is a side view of the movable unit.
Figure 4:
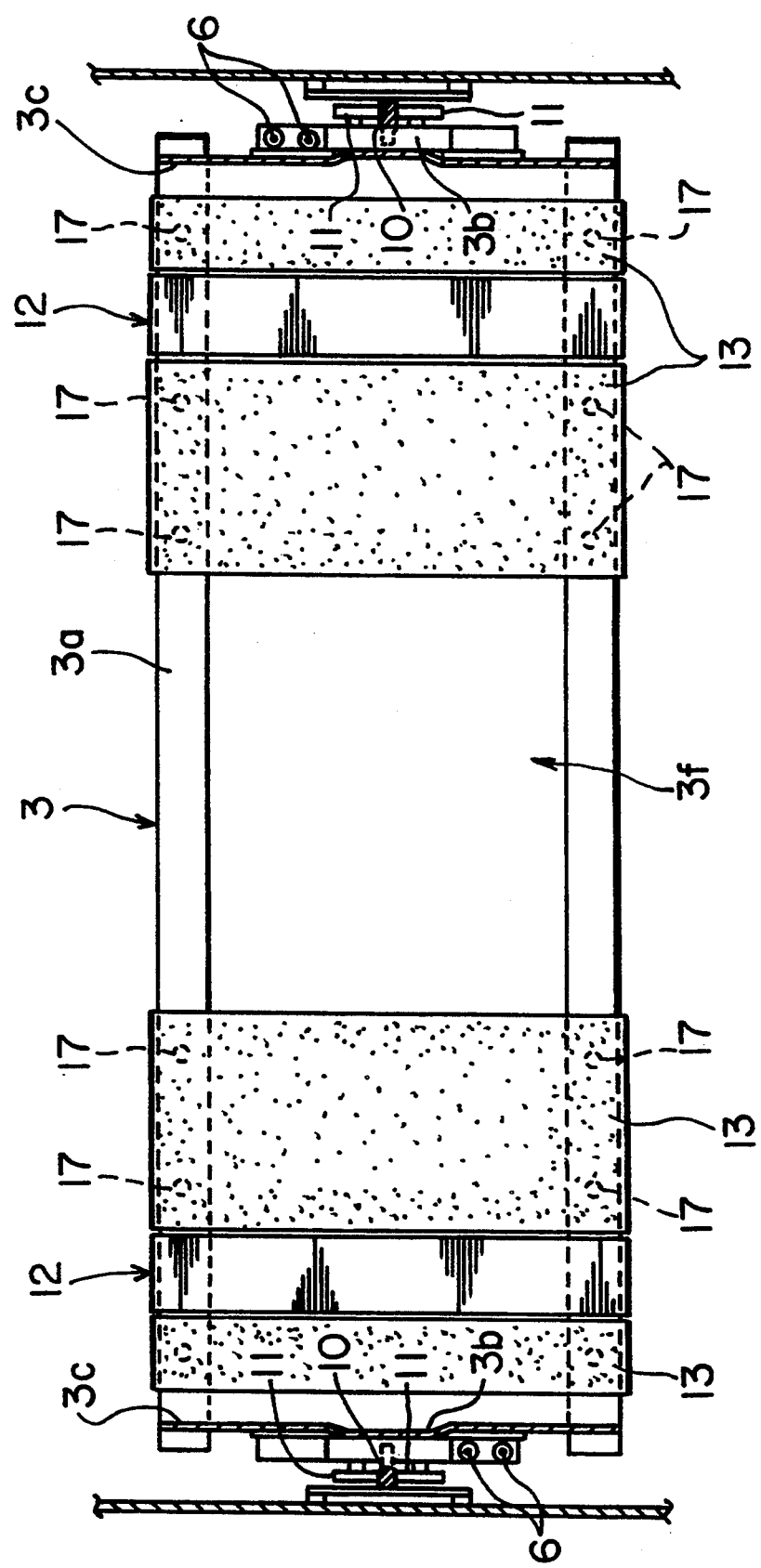
FIG. 4 is a plan view of the movable unit.

As shown in FIGS. 2 through 4, the movable unit 3 has a basic structure including frames 3a suspended by the cables 6, and side posts 3b erected on opposite longitudinal ends of the frames 3a. Each side post 3b has two pairs of rollers 11 disposed at upper and lower ends thereof, respectively. The rollers 11 forming each pair hold a guide rail 10 extending through the vertical shaft S, whereby the movable unit 3 is guided in its vertical movement to avoid tilting thereof. The frames 3a carry two fork assemblies 12 acting as a pallet support extendible into a selected one of the vehicle storing racks A and retractable therefrom to transfer a vehicle G between one deck 1 and the movable unit 3. The frames 3a further carry footpath floors 13 for allowing a person to walk on the movable unit 3 in his or her movement between the entrance section B and the movable unit 3 when the latter is in the entrance section B.

As shown in FIGS. 1 and 2, the movable unit 3 further includes side plates 3c erected upright on the opposite longitudinal ends of the frames 3a, and a roof-like cover 3d mounted on upper ends of the side plates 3c.

When the movable unit 3 rests in the entrance section B, the side plates 3c and cover 3d are flush with a ceiling and wall surfaces of the entrance section B. Consequently, a chamber space is formed within the entrance section B by the walls, ceiling and floor.

Figure 5:
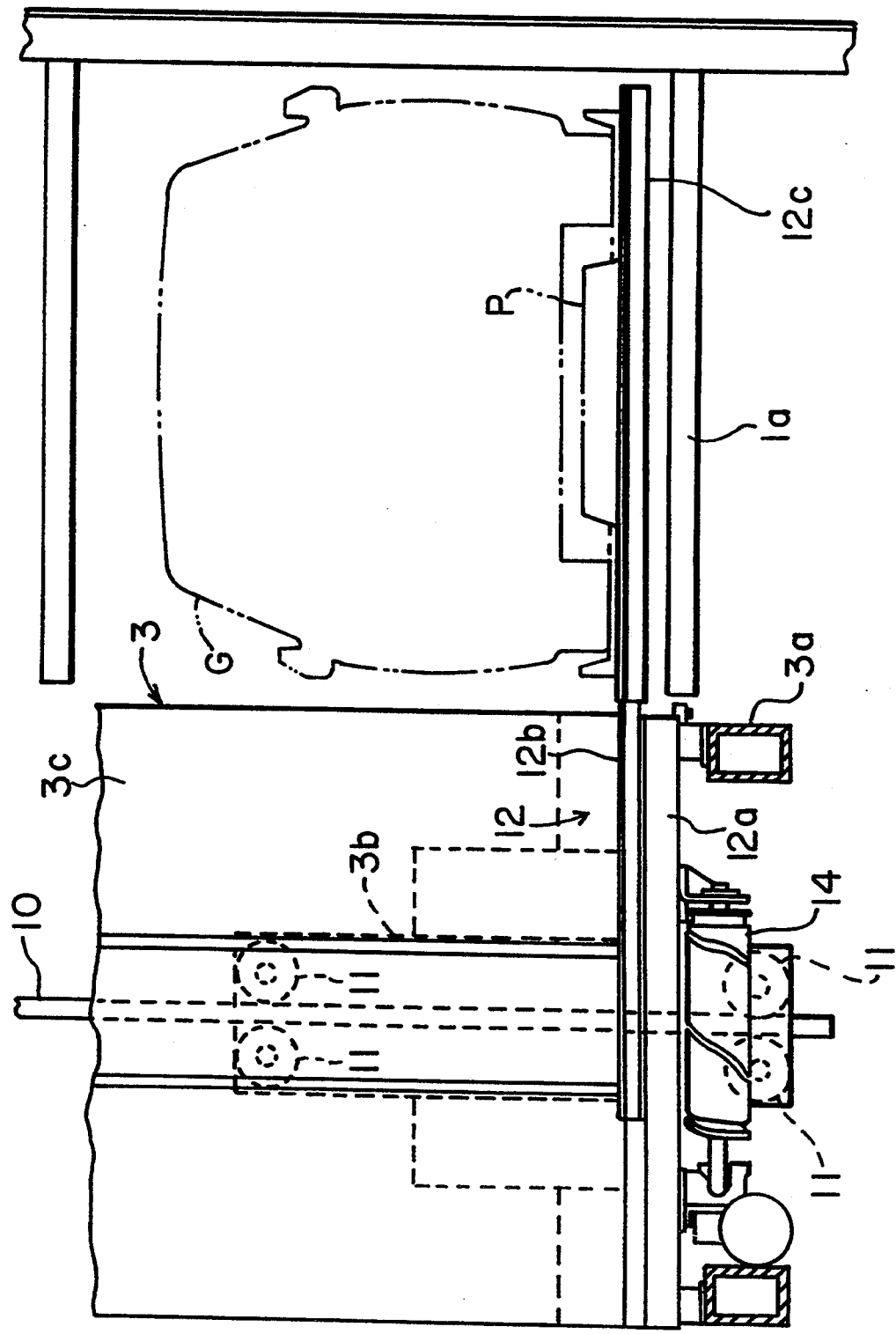
FIG. 5 is a side view of a pallet support.

As shown in FIG. 5, each fork assembly 12 includes a stationary fork blade 12a fixed to the frames 3a, a secondary fork blade 12b longitudinally slidable relative to the stationary fork blade 12a, and a primary fork blade 12c longitudinally slidable relative to the secondary fork blade 12b. The primary fork blade 12c defines a supporting surface of the pallet support for supporting a pallet P. The secondary fork blade 12b is slidable by a cam transmission mechanism having a cylindrical grooved cam 14 rotatable by a drive motor. The primary fork blade 12c is slidable relative to the secondary fork blade 12b by a chain mechanism (not shown) with sliding movement of the secondary fork blade 12b.

As shown in FIGS. 3 and 4, four footpath floors 13 are provided, two of which extend along opposite sides of each fork assembly 12.

Figure 6:
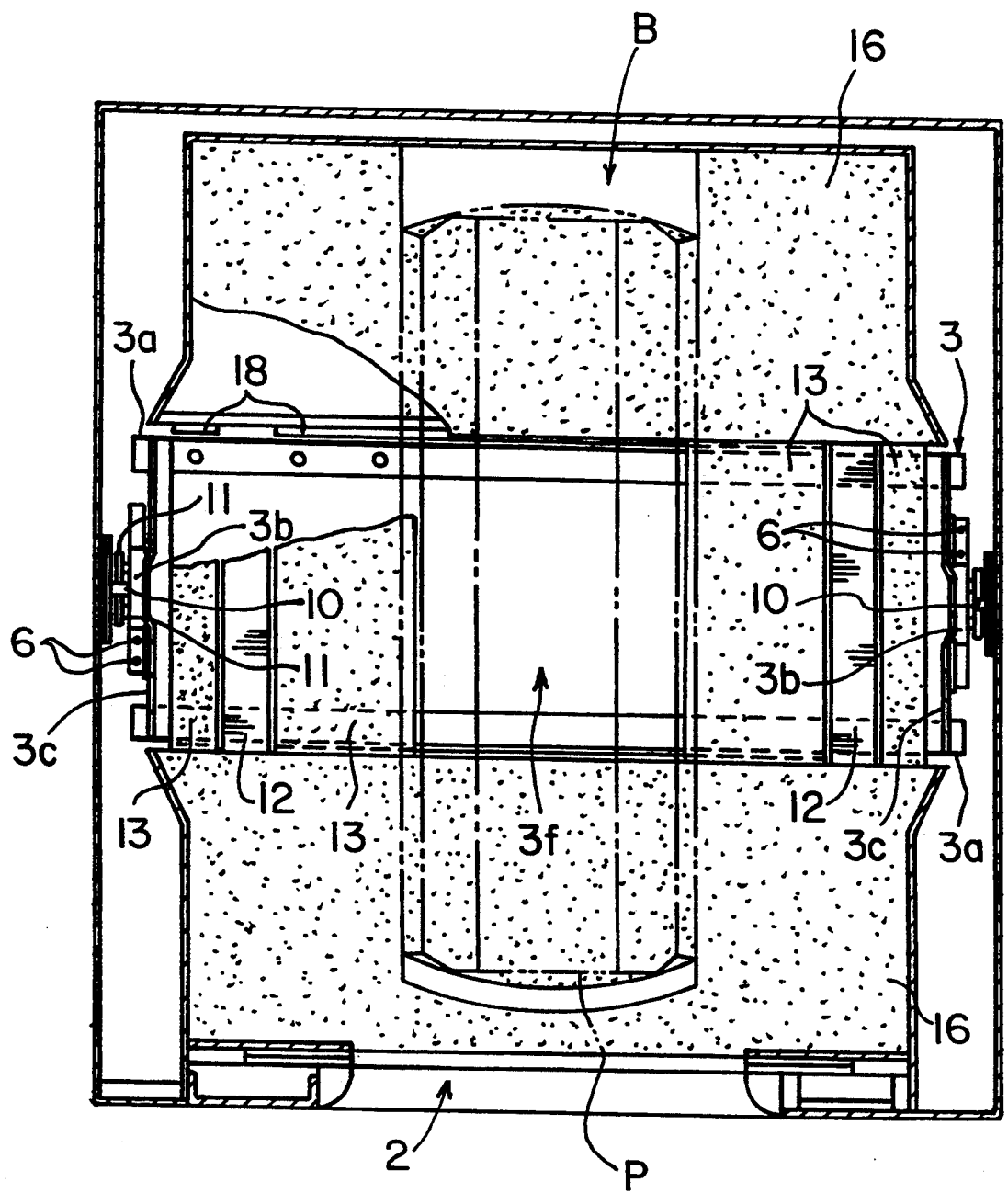
FIG. 6 is a plan view showing the interior of an entrance section.

FIG. 6 shows the interior of the entrance section B with the movable unit 3 present therein to allow a vehicle G to enter or leave the parking structure. A pallet P rests on floor surfaces 16 of the entrance section B, after being turned 90 degrees by the swivel device 5, to extend in the longitudinal direction of the parking structure. In this position, the footpath floors 13 overlie upper surfaces of the frames 3a of the movable unit 3 exposed from under the pallet P.

As shown in FIG. 3, the footpath floors 13 are secured to the frames 3a through posts 17. The posts 17 have a cylinder structure to move the footpath floors 13 vertically in parallel. Thus, the footpath floors 13 are vertically movable relative to the fork assemblies 12.

Coil springs are mounted in the cylinders of the posts 17 for downwardly biasing the footpath floors 13.

The footpath floors 13, as supported by the posts 17, are at a lower level than the upper surfaces of the primary fork blades 12c of the fork assemblies 12, to be out of contact with the lower surface of the pallet P.

Figure 7A:
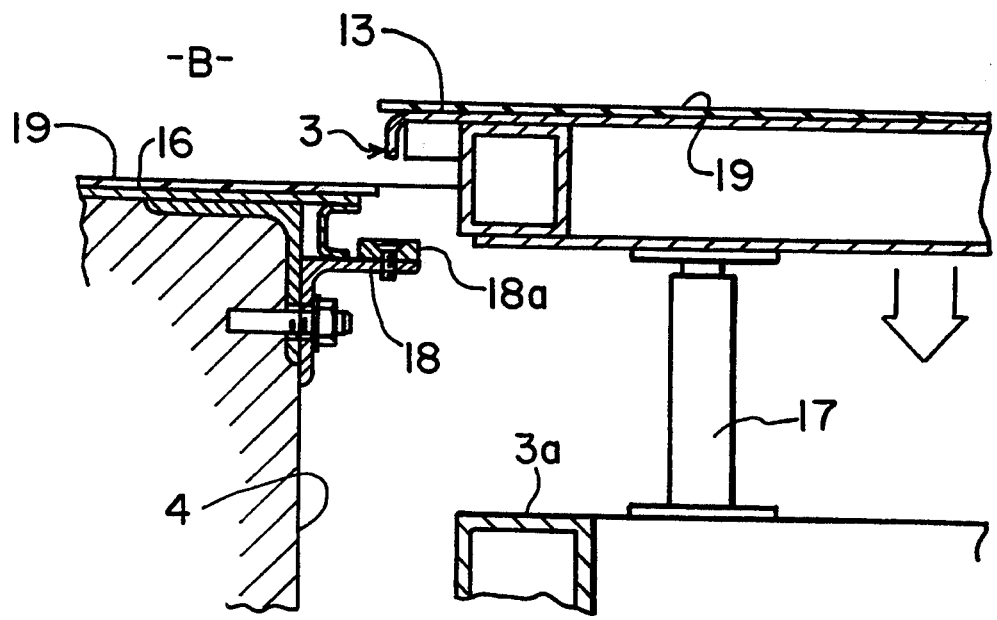
FIGS. 7 (a) and (b) are side views showing a supporting member.
Figure 7B:
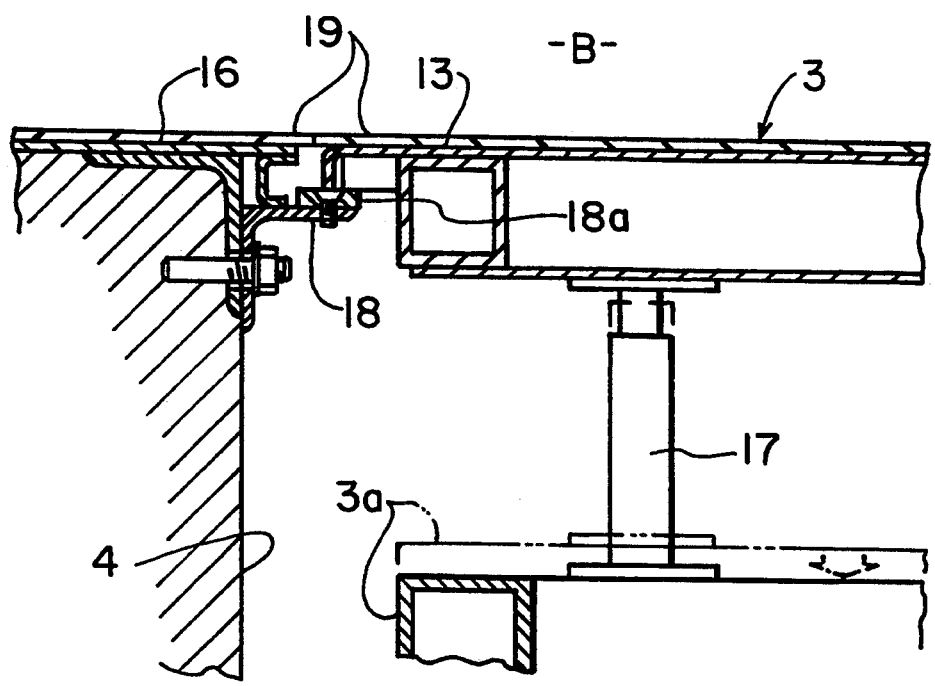

As shown in FIG. 6, the entrance section B includes supporting members 18 arranged adjacent the footpath floors 13 to support the footpath floors 13 when the movable unit 3 is placed in the entrance section B. As shown in FIGS. 7 (a) and (b), each supporting member 18 is formed of an element having an L-shaped section and secured to a side wall of the pit 4. A cushion 18a is mounted on each supporting member 18 to receive one of the footpath floors 13. The footpath floors 13, as supported by the supporting members 18, are level with the floor surfaces 16 of the entrance section B. The footpath floors 13 and the floor surfaces 16 of the entrance section B have rubber sheets 19 acting as elastic members to close gaps between the footpath floors 13 and floor surfaces 16. Portions of the rubber sheets 19 on the footpath floors 13 adjacent the floor surfaces 16 elastically contact the floor surfaces 16 to close the gaps when the movable unit 3 is placed in the entrance section B, i.e. when the footpath floors 13 are supported by the supporting members 18 to be level with the floor surfaces 16.

Figure 8:
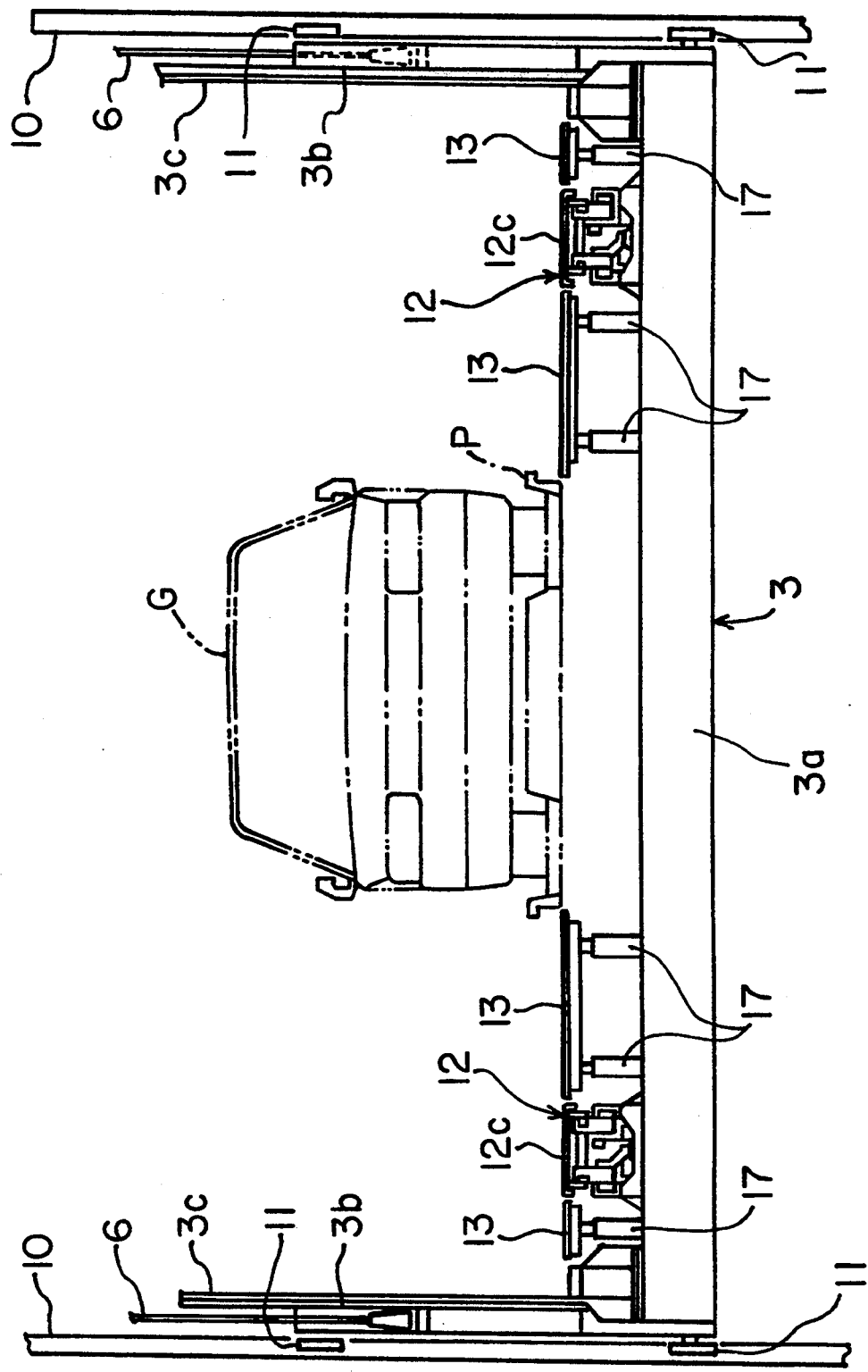
FIG. 8 is a view showing a level of footpath floors.

When the movable unit 3 is lowered down the vertical shaft S and the frames 3a enter the pit 4, the footpath floors 13 are received and supported by the supporting members 18 to be level with the floor surfaces 16 of the entrance section B. When the movable unit 3 is stopped and the upper surfaces of the primary fork blades 12c are placed level with the floor surfaces 16 of the entrance section B, as shown in FIG. 8, the footpath floors 13 are level also with the upper surfaces of the primary fork blades 12c.

When the movable unit 3 is raised from the entrance section B, the footpath floors 13 are supported by the posts 17 and restored to the level below the upper surfaces of the primary fork blades 12c.

Thus, the supporting members 18 act as an adjusting device to keep the footpath floors 13 substantially level with the floor surfaces 16 of the entrance section B and the supporting surfaces of the pallet support 12 when the movable unit 3 is placed in the entrance section B, and below the supporting surfaces of the pallet support 12 when the pallet support 12 is in a position to extend into or retract from one of the vehicle storing racks A.

In the above embodiment, coil springs are mounted in the cylinders of the posts 17 for downwardly biasing the footpath floors 13. However, such coil springs may be omitted, and the footpath floors 13 may descend by gravity.

The posts 17 may, for example, be formed of hydraulic cylinders to drive the footpath floors 13 vertically. In this case, the posts 17 act as the adjusting device.

In the above embodiment, the footpath floors 13 are vertically movable relative to the fork assemblies or pallet support 12 fixed to the frames 3a. Alternatively, the footpath floors 13 may be fixed to the frames 3a, with the fork assemblies arranged vertically movable relative to the footpath floors 13.

Both the footpath floors 13 and fork assemblies 12 may be adapted vertically movable.

Another embodiment will be described next.

Figure 9:
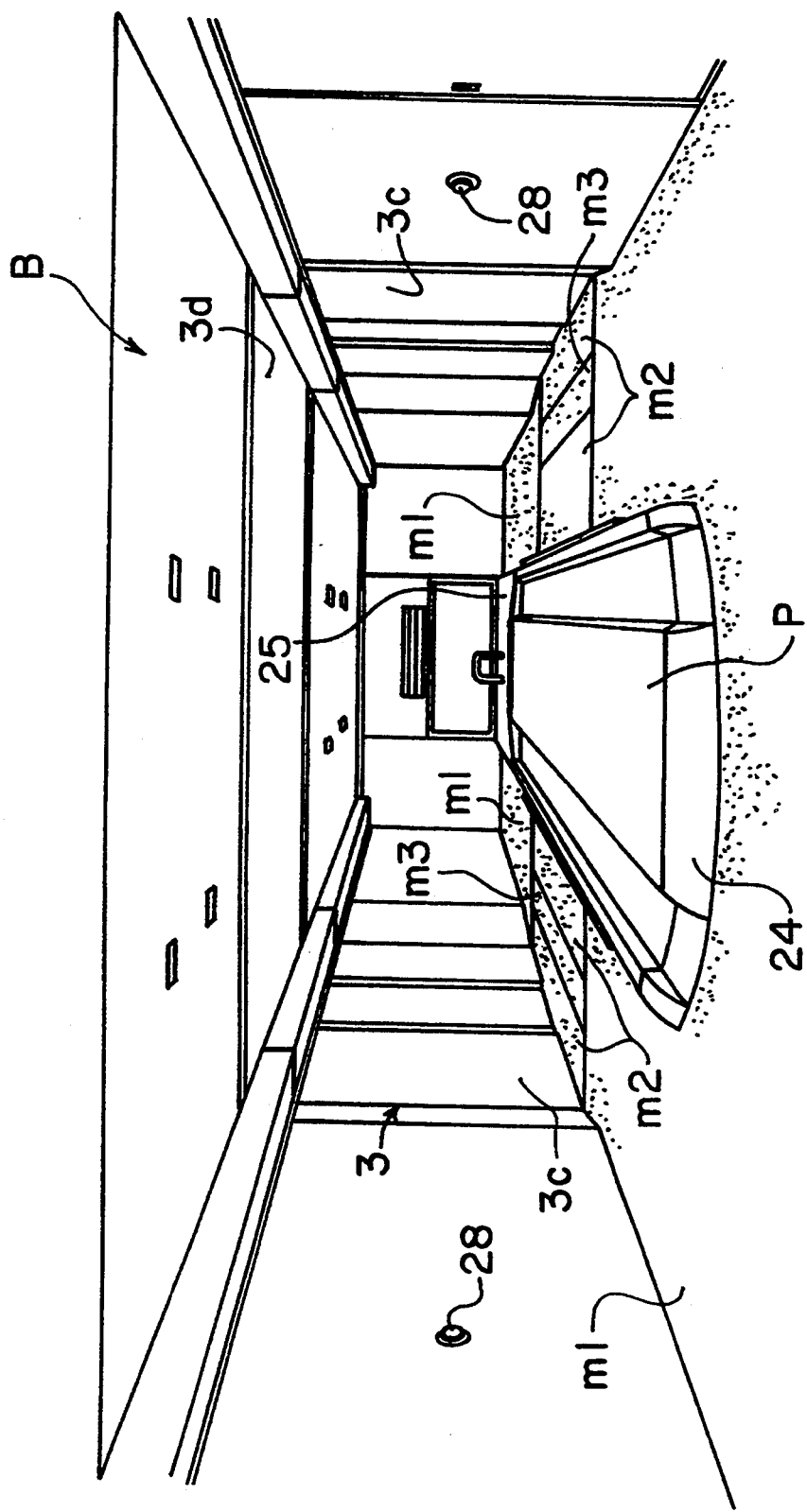
FIG. 9 is a view showing the interior of an entrance section of a multi-deck parking structure in another embodiment of the present invention.

FIG. 9 shows the interior of an entrance section, as seen from an inlet/outlet opening 2, which is ready to receive an incoming vehicle or is in a state after a vehicle has been retrieved. A movable unit 3 is placed with footpath floors 13 level with floors of the entrance section B. Thus, upper surfaces of fork assemblies 12 and footpath floors 13 define walking zones of the movable unit 3 lying in the entrance section B. A pallet P is placed substantially centrally of the entrance section B to extend in the longitudinal direction of this parking structure.

Pallet guides 24 and 25 are formed on the floors of the entrance section B to extend along opposite longitudinal ends of the pallet P.

Mat switches m1 are arranged over entire floor areas of the entrance section B exposed in this state. The fork assemblies 12 and footpath floors 13 of the movable unit 3 also include mat switches m2 and m3. The mat switches m1, m2 and m3 are in the form of piezoelectric sheets which, when trodden by a person, generate an electric signal to detect his or her presence.

Figure 10:
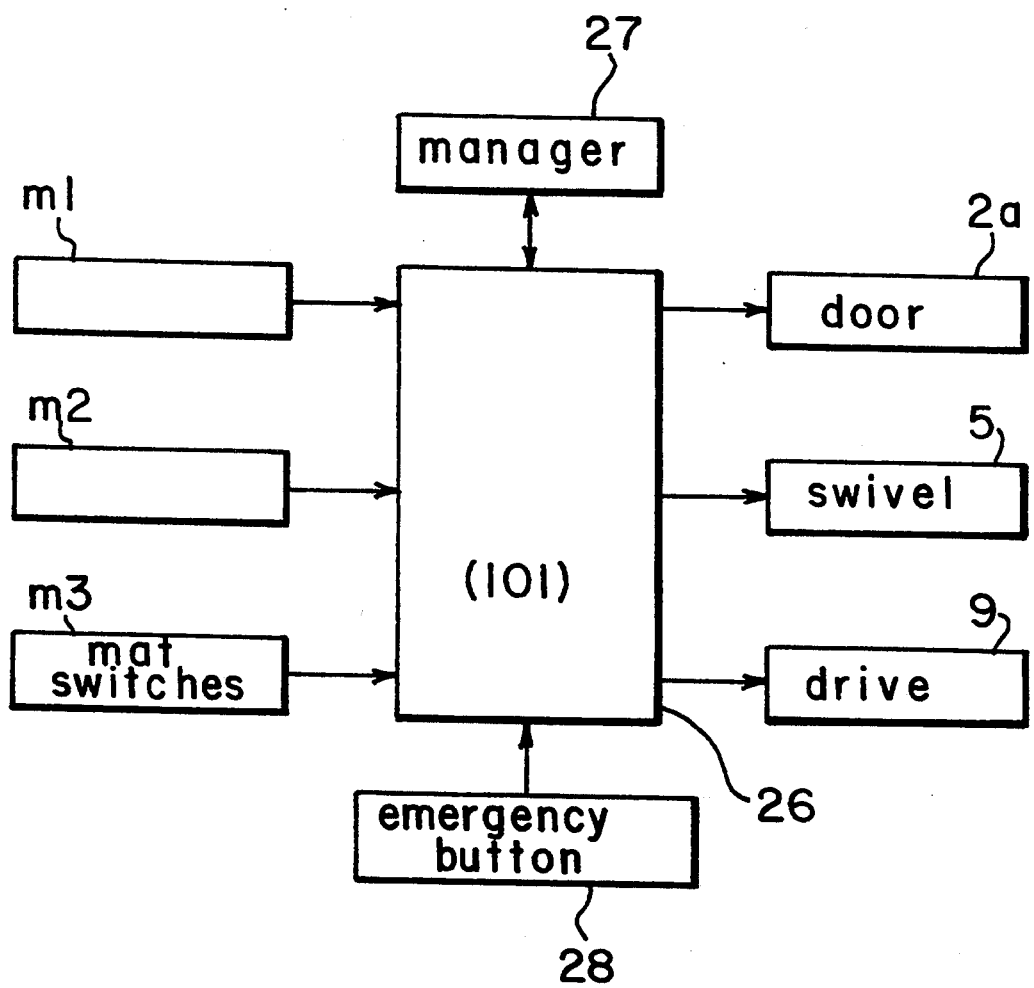
FIG. 10 is a block diagram of a control system of the parking structure shown in FIG. 9.

FIG. 10 shows a control system of this multi-deck parking structure.

A controller 26 has a microcomputer as a main component thereof, which is connected to a managing unit 27, an inlet/outlet door 2a, a swivel device 5, and a drive device 9 for raising and lowering the movable unit 3. In response to operation of the managing unit 27 by a user of the parking structure, the controller 26 controls the inlet/outlet door 2a, swivel device 5 and drive device 9 to carry out vehicle storing and retrieving operations.

Figure 11:
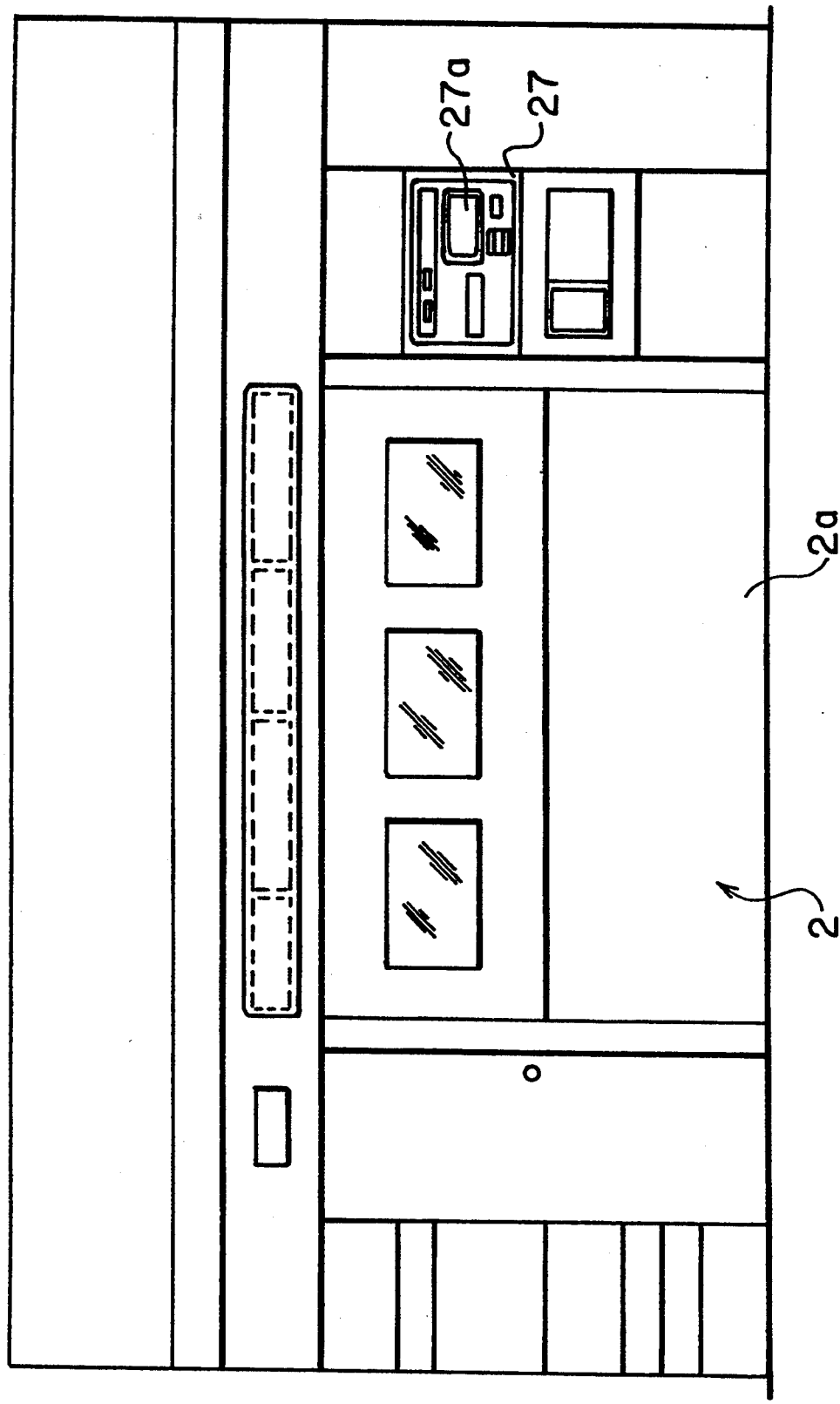
FIG. 11 is a front view of an inlet/outlet opening of the parking structure shown in FIG. 9.

As shown in FIG. 11, the managing unit 27 is disposed on an outer wall of the multi-deck parking structure to one side of the inlet/outlet door 2a. The managing unit 27 includes a touch-panel type display screen 27a for displaying varied control information to users of the parking structure. The users may operate the managing unit 27 by means of touch switches displayed on the display screen 27a.

As shown in FIG. 10, the mat switches m1, m2 and m3 are connected to the controller 26. The controller 26 includes an emergency halt device 101 for stopping the inlet/outlet door 2a, swivel device 5 or drive device 9 in response to detection information from the mat switches m1, m2 and m3.

The emergency halt device 101 is operable also by emergency buttons 28. As shown in FIG. 9, the emergency buttons 28 are installed on inner walls of the entrance section B.

A vehicle is stored in the multi-deck parking structure as follows. Initially, the inlet/outlet door 2a to the entrance section B is shut as shown in FIG. 11. The movable unit 3 lies still in home position inside a vertical shaft S. This position is a standby position to wait for entry of a vehicle to the parking structure The driver of a vehicle G operates the managing unit 27 to instruct start of a vehicle storing operation.

On the storing operation starting instruction, the movable unit 3 transports an empty pallet P to the entrance section B. The swivel device 5 turns the pallet P 90 degrees to set the interior of the entrance section B to the state shown in FIG. 9. The inlet/outlet door 2a is thereafter opened.

The driver drives the vehicle G into the entrance section B, stops the vehicle G on the pallet P, and leaves the vehicle G.

The driver having left the vehicle G walks past the inlet/outlet door 2a out of the entrance section B. Then the driver operates the managing unit 27 again to instruct a subsequent operation to store away the vehicle G.

Upon the instruction to start the subsequent operation, the controller 26 checks detection information from the mat switches m1, m2 and m3.

If none of the mat switches m1, m2 and m3 indicate presence of a person, the inlet/outlet door 2a is shut, the swivel device 5 is driven to turn the pallet P 90 degrees, and the movable unit 3 is raised to store the pallet P on a predetermined one of the decks 1. Then, the movable unit 3 is returned to the home position to complete the vehicle storing operation.

If any one of the mat switches m1, m2 and m3 indicates presence of a person, the controller 26 actuates the emergency halt device 101 to discontinue the subsequent storing operation.

Once the emergency halt device 101 is actuated, the display screen 27a displays a message 29 in a multi-window mode as shown in FIG. 12.

After the emergency halt device 101 is actuated, the subsequent storing operation may be resumed by operating a storing touch switch 20.

The mat switches m1, m2 and m3 are not limited to the piezoelectric sheets, but may be varied as desired. For example, these switches may be sheets formed of a medium capable of detecting electric resistance, or a plurality of point-contact switches distributed to appropriate locations.

The emergency halt device 101 may be adapted, instead of stopping the varied devices, to move these devices to predetermined positions to assure safety.

The controller 26 may be operable to actuate the emergency halt device 101 during a vehicle retrieving operation as well as a storing operation.

What is claimed is:

1. A multi-deck parking structure comprising:
a plurality of decks for storing pallets constructed to carry vehicles, respectively;
an entrance section for receiving and delivering vehicles;
vehicle storing means including said plurality of decks arranged vertically above said entrance section;
vehicle transport means including a movable unit for moving upward and downward through a vertical shaft extending laterally of said vehicle storing means into said entrance section, to transport said pallets between said entrance section and said decks;
pallet support means formed on said movable unit for supporting said pallets, said pallet support means being extendible into and retractable from said vehicle storing means;
footpath floor means formed on said movable unit for allowing a person to walk on said movable unit in moving between said entrance section and said movable unit when said movable unit is in said entrance section, said footpath floor means being vertically movable relative to said pallet support means; and
adjusting means for keeping said footpath floor means substantially level with floor surfaces of said entrance section and supporting surfaces of said pallet support means when said movable unit is placed in said entrance section, and lowering said footpath floor means below said supporting surfaces of said pallet support means when said pallet support means is in a position to extend into or retract from said vehicle storing means.

2. A multi-deck parking structure as defined in claim 1, wherein said adjusting means includes support means disposed in said entrance section for supporting said footpath floor means when said movable unit is placed in said entrance section.

3. A multi-deck parking structure as defined in claim 1, wherein said footpath floor means includes elastic members arranged in positions thereof adjacent said floor surfaces for elastically contacting or lying close to said floor surfaces to close gaps between said floor surfaces and said footpath floor means when said movable unit is placed in said entrance section.

4. A multi-deck parking structure as defined in claim 1, wherein said entrance section includes mat switches arranged substantially over an entire floor area thereof.

5. A multi-deck parking structure as defined in claim 4, wherein said mat switches are in form of piezoelectric sheets for generating an electric signal when trodden by a person, to detect presence of said person.

6. A multi-deck parking structure as defined in claim 1, wherein said entrance section includes an inlet/outlet opening formed in one side wall thereof to allow passage of said vehicles, said inlet/outlet opening having an inlet/outlet door openable and closable by drive means.

7. A multi-deck parking structure as defined in claim 1, wherein said pallet support means includes two fork assemblies.

8. A multi-deck parking structure as defined in claim 1, wherein said movable unit includes frames suspended by cables, and side posts erected on opposite longitudinal ends of said frames.

9. A multi-deck parking structure comprising:
- a plurality of decks for storing pallets constructed to carry vehicles, respectively;
- an entrance section for receiving and delivering vehicles, said entrance section including at least two side walls with an inlet/outlet door disposed at least in one of said side walls for allowing passage of said vehicles;
- a pit formed under said entrance section;
- a swivel means mounted in said pit to be vertically movable and swivelable;
- vehicle storing means including said plurality of decks arranged vertically above said entrance section;
- vehicle transport means including a movable unit for moving upward and downward through a vertical shaft extending laterally of said vehicle storing means into said entrance section, to transport said pallets between said entrance section and said decks, said movable unit being placed in said entrance section when receiving and delivering said vehicles;
- a drive means for raising and lowering said movable unit;
- mat switches arranged substantially over an entire floor area of said entrance section; and
- emergency halt means connected to said mat switches, said emergency halt means being operable in response to detection information from said mat switches to stop said inlet/outlet door, said swivel means and said drive means.

10. A multi-deck parking structure as defined in claim 9, wherein said movable unit includes footpath means for allowing a person to walk on said movable unit when said movable unit is in said entrance section, said footpath means having mat switches for detecting presence of a person thereon.

11. A multi-deck parking structure as defined in claim 10, wherein said mat switches are in form of piezoelectric sheets for generating an electric signal when trodden by a person, to detect presence of said person.

12. A multi-deck parking structure as defined in claim 11, wherein said emergency halt means is operable also by pressing emergency buttons installed on inner walls of said entrance section.

* * * * *